May 6, 1952  B. ROSE ET AL  2,595,545
FILM REELING APPARATUS
Filed Dec. 19, 1947  2 SHEETS—SHEET 1

INVENTORS.
BENJAMIN ROSE
SAMUEL ROSE
BY
*Van Deventer & Grier*
ATTORNEYS

INVENTORS.
BENJAMIN ROSE
SAMUEL ROSE
BY
ATTORNEYS

Patented May 6, 1952

2,595,545

UNITED STATES PATENT OFFICE 2,595,545

FILM REELING APPARATUS

Benjamin Rose and Samuel Rose, New York, N. Y.

Application December 19, 1947, Serial No. 792,694

11 Claims. (Cl. 95—90.5)

This invention relates to film reeling apparatus for reeling roll film from one reel to another, and has for an object the provision of apparatus for developing such films in an improved manner. The invention may, however, be employed in connection with any apparatus where it is desired to move or transport the film from one reel to another; for example, in a reading machine, or other device where it is necessary to transport the film past the lens and then rewind the film.

It is, therefore, a further object of the invention to provide an improved apparatus for reeling film from one reel to another for use in connection with film apparatus of any character.

Other objects and advantages will be apparent from the following specification.

By way of illustration, the invention will be shown as applied to the development of roll films of the ordinary size employed in hand and motion picture cameras, but it will be understood that the disclosure made herein is merely for the sake of illustration and that many changes and modifications can be made in the mode of construction and the form and relationship of the several elements without departing from the spirit and scope of the invention as defined in the appended claims.

Figure 1:
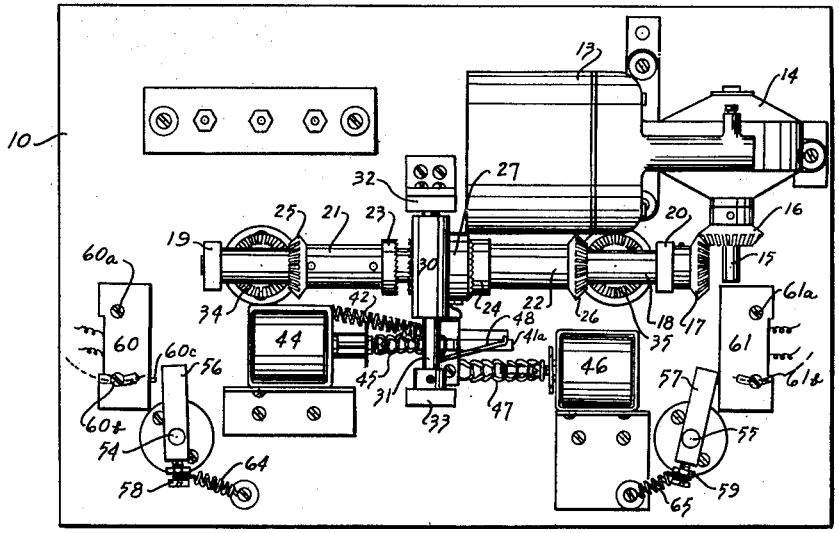
Figure 1 is a plan view of the apparatus embodying the invention.
Figure 2:
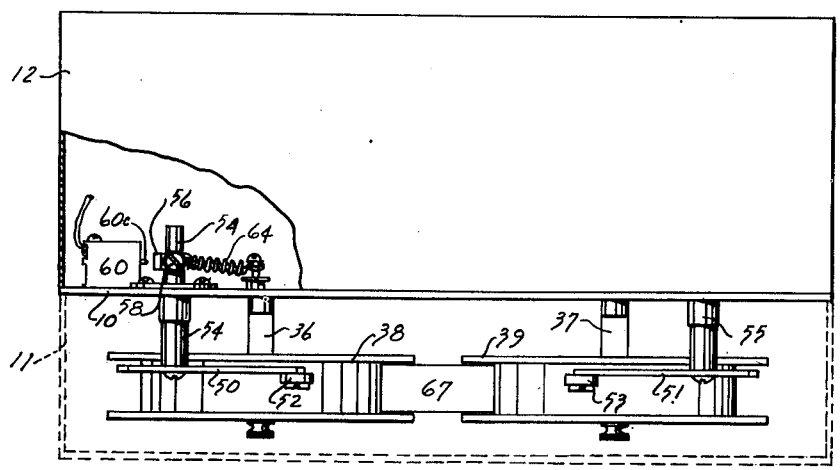
Figure 2 is a front view of the apparatus, Figure 1, with part of the casing broken away to show the interior.

Referring to Figures 1 and 2, the numeral 10 denotes a mounting plate or support upon which the apparatus is assembled. This plate may be made of any suitable material, preferably a non-corrosive metal, and it may form the top of the developer tank shown in dotted lines at 11 and may be provided with a removable top or cover 12.

A motor 13 provided with any suitable gear reducing mechanism 14 is mounted on the plate 10 and the gear reduction shaft 15 carries a pinion 16, which engages a pinion 17, mounted on the driving shaft 18, mounted in the supports 19 and 20, secured to the base.

The driving shaft 18 supports a pair of tubular driven shafts 21, 22, which are supported on the shaft 18 and free to rotate thereon.

The driven shafts 21, 22, carry respectively the toothed clutch collars 23, 24, and also carry the pinions or gears 25, 26.

Mounted upon the driving shaft 18 is the movable member 27, having teeth on its opposite sides. Said member is shiftable along shaft 18 longitudinally so that the teeth thereon may alternately engage the toothed collars 23, 24.

The driving shaft 18, where it supports the member 27, may be splined or otherwise shaped so that the member 27 revolves with the driving shaft 18 but is slidable therealong.

The clutch member 27 is provided with any suitable means for shifting it into and out of engagement with the toothed clutch collars 23, 24. One means of accomplishing this is to provide the movable member 27 with an external groove 28 into which from opposite sides extend pins 29 mounted in a yoke 30, which straddles the member 27. The yoke is mounted on a shaft 31 supported in the uprights 32, 33, mounted on the base. The yoke 30 is therefore free to swing, and when the lower end of it is moved to the right or the left, Figures 1 and 3, the driving shaft will be coupled to the driven shafts 21, 22 in order to drive one or the other of these driven shafts.

The pinions 25, 26 engage respectively the pinions 34, 35 mounted on the upper ends of the vertical reel shafts 36, 37, which are supported in the plate 10, and extend downwardly therethrough into the tank 11.

The lower portions of the reel shafts are usually squared or otherwise shaped to support the usual film reels 38, 39 which are secured thereto in any suitable manner so that the reels will revolve with the shafts without turning thereon.

The means for automatically shifting the clutch member will now be described.

The yoke 30 has a pin 40 projecting from one side thereof and upon this pin is mounted an L-shaped pawl 41. The pawl turns about the pin 40 but swings together with the pin when the yoke moves.

A spring 42 is connected to the free end of the yoke 30 and is supported on a post 43 secured to the mounting plate 10. This spring is tensioned so as to normally draw the yoke 30 to the left, Figures 1 and 3, whereby the teeth on the movable member 27 of the clutch are in engagement with the toothed clutch collar 23 to drive shaft 21 and shaft 36 driven thereby. A suitable magnetic device such as the solenoid 44 is connected by a metallic chain 45 with the upper end of pawl 41.

A second solenoid 46 is connected by chain 47 with the outer end of the yoke pin 40.

Figure 3:
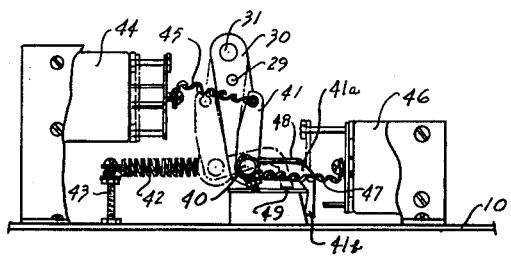
Figure 3 is an enlarged view of the clutch-shifting mechanism shown in Figure 1.
Figure 4:
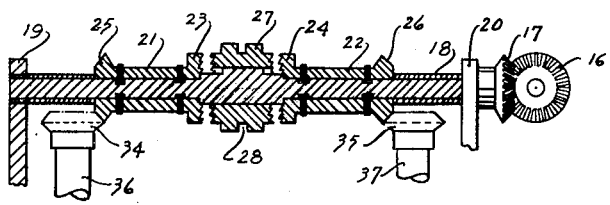
Figure 4 is a sectional view of the driving and driven shafts, Figure 1.

A spring 48 has a few turns around the yoke pin 40, and its outer free end bears downwardly on the outwardly extending nose, 41a of cam 41, so that when said cam is in the position shown in solid lines in Figure 3, the downwardly projecting nose 41b of the cam will hook over and engage the stop 49 secured to the plate 10, thereby locking yoke 30 in a position where the driving shaft 18 is driving the driven shaft 22 and the reel shaft 37 driven thereby. The solenoids 44, 46, are operated to shift the yoke to revolve reels 38 or 39 as follows. There is provided adjacent to each reel, but so positioned that they do not interfere with placing the reels on the shafts, arms 50, 51 which are equipped with any suitable means, such as the rollers 52, 53 adapted to bear against the film wound on the reels. These arms are mounted on shafts 54, 55, which move with the arms and which are supported in and extend through the plate 10. The upper ends of these shafts carry actuating arms 56, 57 which are adjustably secured to the shafts; that is to say, by loosening the screws 58, 59, securing said arms to the shafts, the arms may be rotated about the shafts, which enables the rollers 52, 53, to be positioned in respect to film on the reels in order to operate in a manner to be presently described. Adjacent the outer end of the arms 56, 57 are positioned the switches 60, 61, which may be of any suitable type.

Figure 5:
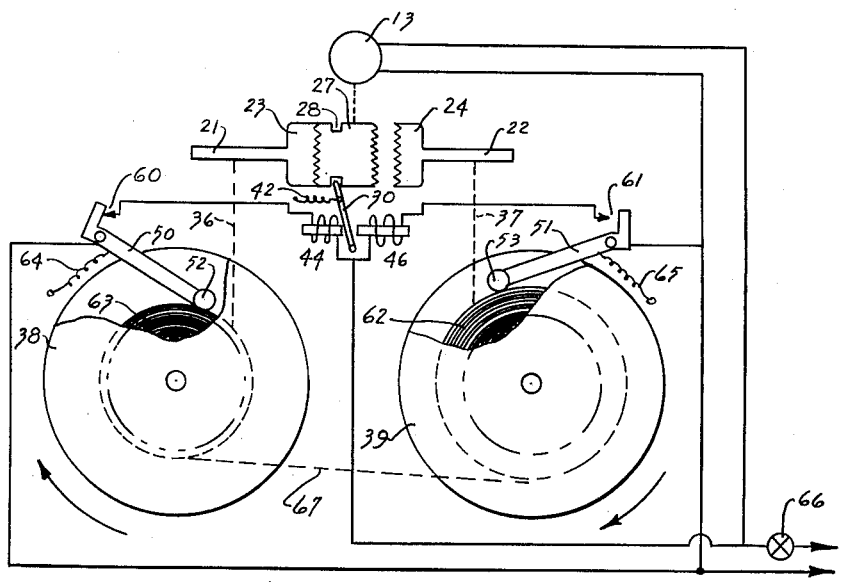
Figure 5 is the wiring diagram of the apparatus shown in Figure 1.

If desired, the switches may be adjustable in respect to the arms, so as to change the timing of the reversal of the apparatus, thus giving an additional way of adjusting the film switches other than by adjusting the arms 56, 57. The adjustment of the switches 60, 61, can be accomplished by providing a clamp screw 60a around which the switch pivots as shown by the dotted line 60b, Figure 1, thus bringing the operating member 60c of the switch nearer to or further away from the actuating arms 56, 57. Referring to Figure 5, it will be assumed that reel 39 is filled with film generally denoted by the numeral 62, and that the outer end or leader strip of this film has been carried over and a few wraps of it wound around the hub of reel 38 as indicated at 63. The switch actuating mechanism comprising the arms 52, 50, 54, 56 are so set that switch 60 is in closed position. The switch actuating mechanism just described is held with its roller 52 in contact with the roll 63 of film by means of a spring 64 in a manner that will be obvious. It will be understood that the switch actuating mechanism and switch 61 employed in connection with reel 39 is the same as that just described, and here the contact mechanism has a spring 65 associated therewith that operates the same as spring 64 previously described to hold the roller 53 in contact with film 62. However, it will be noted that switch 61 of this assembly is open; switch 61 may be adjustable around its supporting screw 61a so that it will swing in the path 61b, Figure 1, if desired.

If now the main switch 66 is closed, motor 13 will operate, revolving the movable member 27 of the clutch, which will be in engagement with the toothed clutch collar 23 to drive the reel 38 via shafts 21 and 36. This is because the spring 42 is urging member 27 into engagement with the toothed clutch collar 23, and besides solenoid 44 is energized and has pulled the yoke 30 to the left, Figure 5. Accordingly, reel 38 is revolved and film 63 is wound from reel 39 to reel 38, the diameter of the roll of film at 63 increasing. It will be understood that reel 39 and its associated driving mechanism-shafts 37 and 22 are free to revolve.

The roll of film at 63 rapidly increases and the arm 50 moves upwardly and switch 60 is almost immediately opened, but as spring 42 still holds the clutch member 27 into engagement with the drive for reel 38, the reel continues to revolve.

As the roll of film at 62 on reel 39 decreases, arm 51 moves downwardly, and finally when only a few wraps of the film remain, or when the leader strip is reached, the contact on switch 61 is closed, solenoid 46 is operated, and the movable member 27 of the clutch is drawn to the right engaging toothed clutch collar 24 and the driving shafts 22 and 37, thereby revolving reel 39 to wind film 62 thereon.

While the film is moving to the right reel 38, shafts 36 and 21 are free as the driving member 27 of the clutch is disengaged therefrom.

It will be noted that almost immediately as soon as reel 39 starts, its switch contact at 61 will be opened and solenoid 46 released, but that the yoke member 30 of the clutch will be held in the right-hand position as the cam nose 41b engages the stop 49, as soon as solenoid 46 operates, and therefore the clutch is locked in position to drive reel 39 until the cam 41 is released by the operation of solenoid 44.

It will be understood that the entire mechanism for operating the clutch as herein described is merely illustrative, and that many other arrangements may be used to cause the clutch to operate to move the film first in one direction until a predetermined amount of it has been wound on one reel, and then automatically reverse the movement of the film in order to wind a predetermined amount of it on the other reel, and that by properly setting the arms 50, 51 in relation to the film on the reels, the apparatus will automatically operate to cyclically move the film back and forth in the developer in tank 11 as long as desired.

One advantage of the arrangement disclosed is the very short time in which the solenoids 44, 46 are in operation, thus eliminating the objectionable hum or vibration which often occurs with such solenoids or their equivalents, such as relays or the like, when they are kept energized by alternating current in order to hold a clutch or the like in position during the winding periods.

It will be seen that the arms 50, 51 can be so adjusted, if the proper type of switches 60, 61 are used, so that only two or three wraps more or less of film are necessary in order to cause the switches to either open or close. Or, the switches may be adjusted relative to the arms.

As one of the reels is always free when the other reel is winding, there is no strain placed on the film 67 extending between the reels.

The arms 50, 51 being spring-pressed against the film, act as brakes to prevent any over-run of film from the free reel.

The film may be wound on the reels so that the rollers 52, 53 do not bear on the emulsion side of the film, and the motion of the film back and forth through the developer insures speedy and perfect development without the necessity of any other means of agitating the film in the developer or of agitating the developer itself, the motion of the film and the reels in the developer acting to stir the same.

While the invention is disclosed as applied to an automatic developing tank, it will be understood that the invention may be applied to any other device having film reels in a tank in which it is desired to transport a film from one reel to another, and then reverse the direction of movement of the film and rewind the same.

What is claimed is:

1. In apparatus for processing photographic film, a motor, a pair of driven shafts, a clutch for connecting said motor alternately to either of said shafts to permit the non-connected shaft to revolve freely and independently of said motor, a tank adapted to hold liquid, film winding means driven by said shafts including film reels adapted to be immersed in liquid in said tank, said reels to wind rolls of film, and switch means extending into said tank for controlling said clutch including movable members contacting said film and moved thereby whereby said clutch will be operated to connect said motor to drive said shafts alternately in opposite directions to wind said film in said tank from one roll to the other.

2. The apparatus as claimed in claim 1, including a driving shaft permanently connected to said motor to be driven thereby and revolvably held against longitudinal movement upon which said driven shafts are supported, and wherein said clutch is supported on said driving shaft and is shiftable therealong by said switch means to engage either of said driven shafts.

3. In apparatus for processing photographic film, a tank, a mounting plate overlying said tank, a pair of reel shafts extending through said plate and adapted to rotatably support film reels in said tank, film reels on said shafts and positioned in said tank thereby, means on the upper side of said plate for alternately driving said shafts and reels in opposite directions, said means including a motor, a clutch rotatively supported on said plate connected to said motor and adapted when operated to alternatively drive said shafts, means for operating said clutch including a switch, a film immersed in liquid in said tank and extending between said reels and having its ends wound thereon, and means in said tank adapted to contact said film on said reels and extending through said plate to operate said switch thereabove independently of the tension of said film.

4. The apparatus as claimed in claim 3, wherein said means in said tank includes adjustable arms engaging the film rolled on each of said reels, whereby the timing of the reversal of the direction of rotation of said reels may be predetermined.

5. The apparatus as claimed is claim 3, wherein said means in said tank includes arms engaging the film rolled on said reels and switches independently adjustable relative to said arms, whereby timing of the reversal of the direction of rotation of said reels may be predetermined independently of the tension of said film.

6. In apparatus for processing photographic film, a driving shaft, a pair of driven shafts, a clutch interposed between said driving shaft and said driven shafts whereby either of said last shafts may be driven, means for operating said clutch to cause same to drive either of said driven shafts, including a yoke member embracing a part of said clutch and movable to operate the same, magnetically operated means adapted to move said yoke, a tank adapted to hold liquid, means including film reels adapted to be immersed in liquid in said tank, said reels being connected to said driven shafts for winding a film in said tank thereabout, and means including a circuit having a source of current and contacts therein, a movable member carrying one of said contacts, said member contacting said film and being moved thereby and independent of the tension thereof to control said circuit, said magnetic means being serially included therein.

7. Apparatus as claimed in claim 6, including a pawl connected to said yoke member and adapted when said member is moved to lock said yoke in operated position.

8. Apparatus as claimed in claim 6, including a spring connected to said yoke member to urge the same to operatively connect said clutch to one of said driven shafts.

9. In an apparatus for processing photographic film, a pair of shafts axially aligned in end-to-end relationship and adapted to be separately driven, a driving member axially aligned with said shafts and adapted to be shifted to engage either shaft to drive the same, a tank adapted to hold liquid, film reeling means including film reels adapted to be immersed in liquid in said tank, said reels being driven by said shafts, electrically operated means for shifting said member to engage either shaft, and a contact mechanism including a pivoted arm contacting said film and moved thereby, said arm having a contact in series with said electrically operated means and controlling the same whereby said driving member may be shifted to shaft-engaging position.

10. The combination as claimed in claim 9, wherein said driving member includes a clutch and a yoke for shifting said clutch and wherein said electrically operated means includes a magnetically actuated device, and wherein said last device is connected to said yoke by a flexible member.

11. In an apparatus for processing photographic film, a pair of shafts in end-to-end relationship and adapted to be separately driven, a driving member adapted to be shifted to engage either of said shafts to drive the same, a tank adapted to hold liquid, film reeling means in said tank driven by said shafts, spring means tending to urge said driving member to engagement with one of said shafts, electrically operating means for shifting said member against the tension of said spring to engage the other of said shafts, and a contact mechanism including a pivoted arm contacting said film and moved thereby, said arm having a contact in series with said electrically operated means to control the actuation of same whereby said driving member may be shifted to shaft-engaging position.

BENJAMIN ROSE.
SAMUEL ROSE.

REFERENCES CITED

The following references are of record in the file of this patent:

UNITED STATES PATENTS

| Number | Name | Date |
| --- | --- | --- |
| 1,123,147 | Sherman | Dec. 29, 1914 |
| 1,144,673 | Wheeler | June 29, 1915 |
| 1,210,955 | Langheck | Jan. 2, 1917 |
| 1,695,857 | Proctor | Dec. 18, 1928 |
| 1,714,816 | Proctor | May 28, 1929 |
| 1,969,823 | Smith | Aug. 14, 1934 |
| 2,069,631 | Thomas | Feb. 2, 1937 |
| 2,088,451 | Thomas | July 27, 1937 |
| 2,419,476 | Begun | Apr. 2, 1947 |
| 2,480,880 | Richard | Sept. 6, 1949 |

FOREIGN PATENTS

| Number | Country | Date |
| --- | --- | --- |
| 106,047 | Sweden | Dec. 1, 1942 |